United States Patent [19]
Jackson, Jr. et al.

[11] 3,859,246

[45] Jan. 7, 1975

[54] BUTANEDIOL POLYESTER COMPOSITIONS CONTAINING TALC AND HAVING IMPROVED HEAT-DISTORTION TEMPERATURES

[75] Inventors: Winston J. Jackson, Jr.; Herbert F. Kuhfuss; John R. Caldwell, all of Kingsport, Tenn.

[73] Assignee: Eastman Kodak Company, Rochester, N.Y.

[22] Filed: Nov. 30, 1973

[21] Appl. No.: 420,493

Related U.S. Application Data

[63] Continuation of Ser. No. 867,902, Oct. 20, 1969, abandoned.

[52] U.S. Cl. .................. 260/40 R, 260/DIG. 24
[51] Int. Cl. ............................................ C08g 51/04
[58] Field of Search..... 260/40 R, DIG. 24, DIG. 41

[56] References Cited
UNITED STATES PATENTS

| | | | |
|---|---|---|---|
| 3,284,378 | 11/1966 | Roberts | 260/40 R |
| 3,516,957 | 6/1970 | Gray et al. | 260/40 R X |
| 3,624,024 | 11/1971 | Caldwell et al. | 260/40 R |

FOREIGN PATENTS OR APPLICATIONS

| | | | |
|---|---|---|---|
| 1,010,043 | 11/1965 | Great Britain | 260/40 R |

*Primary Examiner*—Morris Liebman
*Assistant Examiner*—S. M. Person

[57] ABSTRACT

The heat-distortion temperature of linear polyesters of 1,4-butanediol and terephthalic acid can be increased by at least 20°C. by incorporating therein at least about 10 percent by weight of a talc filler.

5 Claims, No Drawings

BUTANEDIOL POLYESTER COMPOSITIONS CONTAINING TALC AND HAVING IMPROVED HEAT-DISTORTION TEMPERATURES

This application is a continuation of our copending application Ser. No. 867,902 filed Oct. 20, 1969, entitled, "Butanediol Polyester Compositions Containing Talc and Having Improved Heat-Distortion Temperatures," now abandoned.

This invention relates to reinforced polyester compositions having improved heat-distortion temperatures and to a method for their preparation. More particularly, the invention relates to polyesters of 1,4-butanediol and terephthalic acid or their condensable derivatives containing a talc filler.

Filler materials of various types have been disclosed in the prior art for incorporation into polyesters. Fillers in general, however, are not recognized as having an ability to increase the heat-distortion temperature of polyesters. Talc, for example, when added to poly(ethylene terephthalate), does not have any appreciable effect on the heat-distortion temperature of the polymer.

The importance of a high heat-distortion temperature for polymers, particularly molding plastics, is well recognized, and further comment here in this regard is considered unnecessary. Suffice it to say that a high heat-distortion temperature is equally desirable in the polyesters with which the present invention is concerned, that is, the polyesters of 1,4-butanediol and terephthalic acid or their condensable derivatives.

It has no been found that when talc is used as the filler in a polyester of 1,4-butanediol and terephthalic acid or their condensable derivatives, a surprisingly high increase in the heat-distortion temperature of the polyester composition is obtained. The increase is surprising for several reasons. One is the aforementioned fact that the same filler has little effect on the heat-distortion temperature of poly(ethylene terephthalate). Another reason is the fact that other conventional fillers such as, for instance, alumina, silica, silica-alumina, pumice, calcium carbonate, clay, carbon black, antimony trioxide, and titanium dioxide fail to provide increased heat-distortion temperatures in the polyesters of this invention. For some reason, not as yet completely understood, talc does possess the ability to increase the heat-distortion temperature of polyesters of terephthalic acid and 1,4-butanediol, even though it exhibits no such activity with polyesters such as poly(ethylene terephthalate).

The talc filler of the invention is employed in a finely divided form and the particle size may vary widely as, for instance, from about 0.01 to about 1,000 microns, with the preferred particle size being less than about 50 microns. The particle may also assume any naturally existing or desired shape as, for instance, acicular, fibrous, flat platelet, etc.

The amount of filler added to the polyester is that sufficient to effect an appreciable increase in the heat-distortion temperature of the polyester, for instance, an increase of at least 20°C. for crystallized polyester. In general, the concentration of talc required to effect an increase of this magnitude is about 10 percent up to 50 percent by weight based on the total composition. An amount of about 10 to 30 percent by weight is preferred. In addition to increasing the heat-distortion temperature, a concentration of at least 10% by weight talc also provides the polyesters with an increase in flexural modulus (stiffness of at least about $0.8 \times 10^5$ psi.

The mechanism by which the talc increases the heat-distortion temperature is not known for certain. As aforementioned and as will be shown in the working examples below, other fillers of similar particle size and in like concentration have been tried and fail to give an appreciable effect on the heat-distortion temperature of polyesters of 1,4-butanediol and terephthalic acid. Also, as previously mentioned, the talc, although inducing this heat-distortion temperature increase in polyesters of 1,4-butanediol and terephthalic acid, fails to do so in polyesters such as poly(ethylene terephthalate). Nucleation or a nucleating effect does not appear to be the answer to the mechanism involved in that, when nucleating agents are added to crystallize polymers such as poly(ethylene terephthalate), less than 1 percent by weight is required to effectively nucleate the polymer. Since 5 percent by weight talc has very little effect on the heat-distortion temperature of the polyester of 1,4-butanediol and terephthalic acid, it becomes evident that this additive is not functioning as a nucleating agent in the polyester composition of the invention.

The polyesters of the present invention to which the talc is added are composed of linear polyesters of at least 80 mole percent 1,4-butanediol (based on 100 mole percent glycol) and at least 80 mole percent terephthalic acid (based upon 100 mole percent dicarboxylic acid) or their condensable derivatives. The polyesters are prepared by conventional techniques, such as by ester interchange of the glycol and a condensable derivative such as a dialkyl ester of the dicarboxylic acid or by direct esterification of the glycol and dicarboxylic acid. See Jackson, Kuhfuss and Caldwell concurrently filed application Ser. No. 867,929, filed Oct. 20, 1969, entitled, "Molded Articles of Butanediol Polyesters" which is incorporated herein by reference, said concurrently filed application now being replaced by continuation-in-part application Ser. Nos. 64,642 and 64.646.

Conventional esterification catalysts such as tetraisopropyl titanate are advantageously employed and the preferred polymerization temperatures are about 240° to 260°C. The talc may be added with the polyester reactants before the polyester is prepared, or the talc may be blended with the polyester, after its preparation, by conventional techniques.

If desired, the polyester may be modified with up to about 20 mole percent of other glycols or dicarboxylic acids, but preferably it is not modified. Other dicarboxylic acids which may be used to modify the polyester include dicarboxylic acids containing 3 to 20 carbon atoms such as aliphatic dicarboxylic acids of 3 to 20 carbon atoms, alicyclic dicarboyxlic acids of 6 to 20 carbon atoms and aromatic dicarboxylic acids of 8 to 16 carbon atoms. Illustrative of suitable dicarboxylic acids are isophthalic acid, adipic acid, azelaic acid, dimethylmalonic acid, dodecanedicarboxylic acid, the isomeric cyclohexamedicarboyxlic acids, sulfonyldibenzoic diphenic, oxydibenzoic and methylenedibenzoic acids. Illustrative of other glycols which may be used to modify the polyester are glycols of 2 to 20 carbon atoms including aliphatic glycols of 2 to 20 carbon atoms and alicyclic glycols of 4 to 20 carbon atoms; these are exemplified by ethylene glycol, neopentyl glycol, 1,4-cyclohexanedimethanol, 1,10-decanediol, 1,4-cyclohexanediol, 2-ethyl-2-butyl-1,3-propanediol and 1,6-hexanediol.

The inherent viscosities (I.V.) of the polyesters of the invention are ordinarily at least about 0.8 and, preferably, at least about 1.25 up to about 2.5 or more as measured at a concentration of 0.23 g./100 ml. in 60/40 parts by weight of phenol/tetrachloroethane at 25°C. The preferred polyesters have been found to provide molded articles having a notched Izod impact strength of at least about 0.6 ft. lb./inch notch. When the I.V. is above 1.25, high flexural modulus values can be obtained such as $4 \times 10^5$ psi. or higher. In general, the talc filled polyesters of this invention have a flexural modulus at least 30 percent greater than when no talc is present.

The polyester compositions of the invention may be shaped into a variety of articles. For example, the compositions may be extruded into rods or bars, pelletized or shaped into an article. Any of the well-known shaping methods such as the conventional molding techniques may be used as, for instance, injection molding, compression molding and the like. The shaped article is advantageously heated while molding or is annealed at a temperature of at least about 80°C. At least about 5 minutes is generally used for annealing whereas the complete molding cycle, including annealing in the mold, can be carried out in 30 to 60 seconds, depending upon the size of the articles.

If desired, the compositions of the invention may contain nucleating agents, pigments, antioxidants, glass fibers and other fillers, stabilizers, plasticizers, lubricants, and other additives. Fire retardant agents may be present; preferably, they contain bromine atoms attached to aromatic rings, e.g., tetrabromophthalic anhydride or 4,4'-isopropylidenebis(2,6-dibromophenyl acetate). The addition of antimony oxide in addition to halogen compounds improves the fire resistance.

The following examples are included to further illustrate the present invention.

EXAMPLES

In each of the following examples the polyester is ground to pass a 20-mesh screen, mixed with the talc filler, dried in a vacuum oven at 100°C. overnight, and blended in a heated screw extruder. Pellets of the filled polyester are dried in a 100°C. oven and injection-molded into unheated molds with a 1 oz. Watson-Stillman injection-molding machine to give bars for testing. (In Example 5 a 4 oz. Reed-Prentice injection-molding machine is used.) ASTM procedures are used for measuring the tensile strength and elongation (ASTM D1708), flexural modulus (ASTM D790), and Izod impact strength (ASTM D256 Method A). The heat-distortion temperature as used in this specification and the appended claims is the temperature at which 0.2 percent deflection of a 2-inch span of a ⅛-inch bar occurs at 264 psi. as measured in a forced convection oven as described in Modern Plastics, 34, No. 3, 169 (1956).

EXAMPLE 1

Poly(tetramethylene terephthalate) having an I.V. of 1.63 is conventionally prepared from dimethyl terephthalate and 1,4-butanediol. The polyester is blended, as described above, with each of the following fillers to give 10 weight percent based on the total weight in the final blends:

Talc (Desertalc 84 from Desert Minerals, Inc., Los Angeles, Calif.; talc passes 325-mesh screen and has platey-acicular particle structure)
Silica (Hi—Sil—C from Columbia Southern, subsidiary of Pittsburg Plate Glass, Pittsburg, Pa.)
Alumina (Alon C from Cabot Corp., Boston, Mass.)
Titanium dioxide (Tipure 33 from DePont, Edgemoor, Del.)
Antimony trioxide (No. A-860 from Fisher Scientific Co., Fair Lawn, N.J.)
Calcium carbonate (Super Multifex from Diamond Alkali, Cleveland, Ohio)
Kaolin powder (Code 1814, B and A Quality, from Allied Chemical and Dye Corp.)
Pumice (Charles A. Wagner Co., Philadelphia, Pa., particles pass 200-mesh screen)
Carbon black (Norit SG II from L. A. Salomon and Bro., New York, N.Y.)

Except for the pumice particles, which pass a 200-mesh screen, all of the above particles are sufficiently fine to pass a 325-mesh screen, which corresponds to a particle size of 43 microns and smaller. A very small particle size is generally considered to be especially advantageous, and two of the above fillers, silica and alumina, are less than 0.1 micron in size.

Table 1 lists the test results of bars which are molded and tested as described above. Also includes are the heat-distortion temperatures of bars annealed for 30 min. in an oven at 110°C. After this treatment the tensile strength is somewhat higher, the impact strength is slightly lower, and the heat-distortion temperature of the talc filled composition is appreciably higher. The annealing treatment increases the crystallinity of the bars and simulates results obtained when the bars are molded into molds at 100°C. on large injection-molding machines as illustrated in Example 5 below.

TABLE 1

| Filler (10 Wt. %) in Polyester | Izod Impact Strength, Ft.-Lb./In. Notch | Tensile Strength, psi. | Elong., % | Flexural Modulus, $10^5$ psi. | Heat-Distortion Temperature, °C. | |
|---|---|---|---|---|---|---|
| | | | | | As Molded | Annealed[a] |
| None (control) | 1.20 | 6800 | 45 | 3.0 | 55 | 60 |
| Talc | 0.60 | 6900 | 94 | 4.4 | 64 | 91 |
| Silica | 0.29 | 7500 | 23 | 3.7 | 63 | 68 |
| Alumina | 0.35 | 7200 | 31 | 3.6 | 55 | 65 |
| Titanium dioxide | 0.58 | 6900 | 90 | 3.5 | 61 | 60 |
| Antimony trioxide | 0.70 | 6700 | 62 | 3.4 | 57 | 60 |
| Calcium carbonate | 0.37 | 6900 | 30 | 3.6 | 62 | 68 |
| Kaolin clay | 0.42 | 7100 | 40 | 3.3 | 57 | 68 |
| Pumice | 0.54 | 6800 | 32 | 3.6 | 56 | 59 |
| Carbon black | 0.43 | 7100 | 34 | 3.2 | 57 | 65 |

[a] 30 min. at 110°C

Table 1 shows that the talc increases the stiffness (flexural modulus) by 1.4 × 10⁵ psi., which is at least twice as much as any of the other fillers. Normally, increased stiffness in a plastic is associated with decreased impact strength. Surprisingly, however, the talc filled composition has a higher notched Izod impact strength than most of the other filled compositions. In addition, the heat-distortion temperature of the annealed talc filled polyester, 91°C., is 31°C. higher than that of the unfilled control (60°C.). The heat-distortion temperatures of the other annealed compositions are a maximum of only 8°C. higher than the control.

EXAMPLE 2 (for comparison)

Example 1 is repeated, using 5 weight percent of the talc instead of 10 percent. The following properties are obtained: notched Izod impact strength 0.73 ft.-lb./in. notch, tensile strength 6,900 psi., elongation 94 percent, flexural modulus 3.7 × 10⁵ psi., heat-distortion temperature 60°C. (66°C. after annealing 30 min. in oven at 110°C.). This comparative data shows that 5 weight percent talc is not sufficient to appreciably increase the heat-distortion temperature.

EXAMPLE 3 (for Comparison)

Poly(ethylene terephthalate) with an I.V. of 1.00 is blended with 10 weight percent of the talc used in Example 1. Properties of the bars, molded and tested as in Example 1, are listed below in Table 2. Properties of the unfilled molded bars are also given.

TABLE 2

| Property Measured | Unfilled Molded Test Bars | Molded Test Bars Containing 10% Talc |
| --- | --- | --- |
| Tensile strength, psi. | 7200 | 7600 |
| Elongation, % | 420 | 458 |
| Flexural modulus, 10⁵ psi. | 3.0 | 4.0 |
| Heat-distortion temperature | | |
| As molded | 75 | 75 |
| Annealed 30 min. at 110°C. | 99 | 103 |
| Annealed 60 min. at 150°C. | 107 | 115 |

This comparative data shows that for poly(ethylene terephthalate) having an I.V. of 1.0, the heat-distortion temperature is incresed only 4°C. (from 99° to 103°C.) by the talc when the bars are annealed (increased crystallization) at 110°C. When a more strenuous crystallization treatment (1 hr. at 150°C.) is used, the heat-distortion temperature is increased only 8°C. (from 107° to 115°C).

EXAMPLE 4

Poly(tetramethylene terephthalate) with an I.V. of 1.63 is blended with various amounts of talc with a particle size ranging from about 1 to 25 microns and averaging about 5 microns.

Properties of the molded bars are listed in Table 3.

TABLE 3

| | Amount of Talc in Blend, Wt. % | | | | |
| --- | --- | --- | --- | --- | --- |
| | 0 | 5 | 10 | 20 | 30 |
| Izod impact strength, ft.-lb./in. notch | 1.20 | 0.75 | 0.74 | 0.70 | 0.51 |
| Tensile strength, psi. | 6800 | 7000 | 7200 | 7500 | 7700 |
| Elongation, % | 45 | 140 | 64 | 25 | 18 |
| Flexural modulus, 10⁵ psi. | 3.0 | 3.6 | 4.0 | 5.0 | 5.3 |
| Heat distortion Temperature, °C. | | | | | |
| As molded | 55 | 57 | 71 | 72 | 84 |
| Annealed 30 min. at 110°C. | 60 | 69 | 99 | 106 | 117 |

EXAMPLE 5

Poly(tetramethylene terephthalate) with an I.V. of 1.63 is blended with 5 and 10 weight percent of talc which has an average particle size of about 10 microns. The melt-extruded blends are injection-molded in a 4-oz. injectionmolding machine using a mold temperature of 100°C. The properties of the molded bars and of similarly molded bars containing no talc are listed in Table 4. The presence of only 5 weight percent talc is not sufficient to appreciably increase the heat-distortion temperature.

TABLE 4

| | Talc in Blend, Wt. % | | |
| --- | --- | --- | --- |
| | 0 | 5 | 10 |
| Izod impact strength, ft.-lb./in notch | 1.10 | 0.73 | 0.62 |
| Tensile strength, psi. | 8000 | 8200 | 8200 |
| Elongation, % | 60 | 32 | 12 |
| Flexural modulus, 10⁵ psi. | 3.5 | 4.2 | 5.0 |
| Heat-distortion temperature, °C. | 60 | 67 | 115 |

Similar results are obtained when the average particle size of the talc is about 1 micron instead of 10 microns.

When the polymer I.V. is lower (1.10), similar results are obtained except for Izod impact strength, which is lower (0.4 ft.-lb./in. notch for the 10 percent talc blend).

EXAMPLE 6

A copolyester having an inherent viscosity of 1.82 is prepared from 85 mole percent of dimethyl terephthalate, 15 mole percent of dimethyl isophthalate, and 1,4-butanediol. A portion of the copolymer is blended with 10 weight percent of talc with an average particle size of about 5 microns (particles size range about 1 to 25 microns). The effect of talc on the properties of the molded bars is shown in Table 6.

TABLE 6

| | Talc in Blend, Wt. % | |
| --- | --- | --- |
| | 0 | 10 |
| Izod impact strength, ft.-lb./in notch | 1.05 | 0.60 |
| Tensile strength, psi. | 4100 | 4600 |
| Elongation, % | 227 | 30 |
| Flexural modulus, 10⁵ psi. | 1.5 | 2.6 |
| Heat-distortion temperature, °C. | | |
| As molded | 44 | 55 |
| Annealed 30 min. at 110°C. | 44 | 65 |

EXAMPLE 7

A copolyester having an inherent viscosity of 1.26 is prepared from dimethyl terephthalate, 1,4-butanediol, and ethylene glycol and containing 88:12 ratio of units from butanediol and ethylene glycol. A portion of the copolymer is blended with 10 weight percent of the talc used in Example 1. The talc increases the heat-distortion temperature of molded bars, annealed at 110°C. for 30 min., from 50 °C. to 74°C.

The invention has been described in considerable detail with particular reference to certain preferred embodiments thereof, but it will be understood that variations and modifications can be effected within the spirit and scope of the invention.

We claim:

1. A stiff, thermoplastically moldable composition having an appreciably increased heat distortion temperature comprising a linear polyester of at least about 80 mole proportions of 1,4-butanediol, based on 100 proportions of diol, and at least 80 mole proportions of terephthalic acid, based on 100 mole proportions of dicarboxylic acid, or their condensable derivatives, having incorporated therein at least about 10 percent by weight of talc, based on the weight of said composition.

2. The composition of claim 1 wherein the heat distortion temperature of test bars annealed for 30 minutes at 110°C. is increased to at least 20°C. greater than the heat distortion temperature obtained when no talc is present.

3. The composition of claim 1 wherein the polyester is poly(tetramethylene terephthalate).

4. The composition of claim 1 wherein the amount of talc is about 10 percent up to 30 percent by weight.

5. A stiff, thermoplastically moldable composition comprising linear poly(tetramethylene terephthalate) having incorporated therein about 10 percent up to 30 percent by weight talc, based on the weight of the composition, wherein the temperature of test bars annealed for 30 minutes at 110°C. is increased to at least 20°C. greater than the heat distortion temperature obtained when no talc is present.

* * * * *